(No Model.)
R. S. WARING.
CONDUIT FOR ELECTRIC WIRES OR CABLES.
No. 378,561. Patented Feb. 28, 1888.
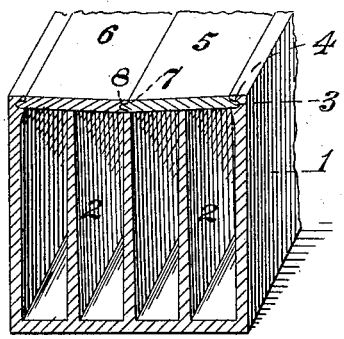
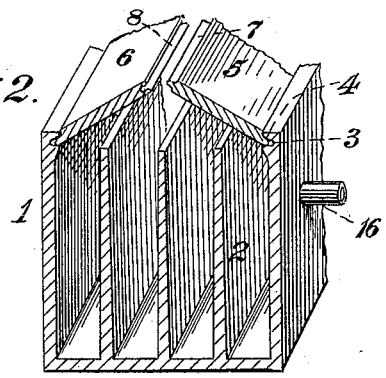
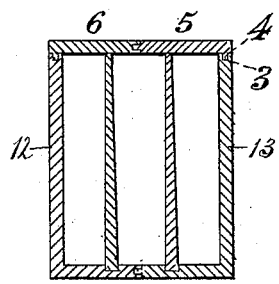
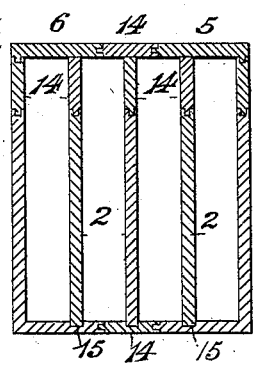
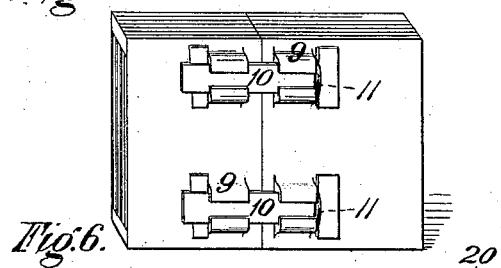
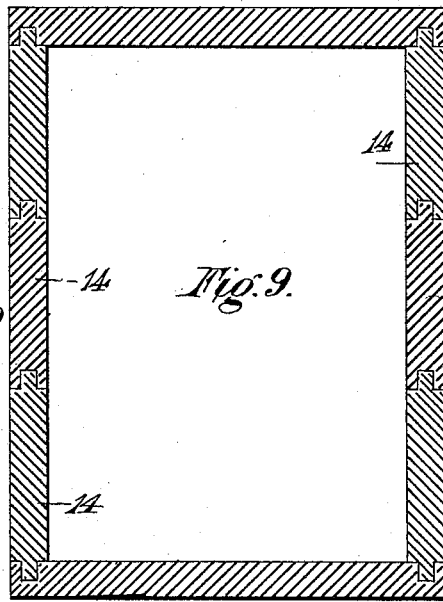
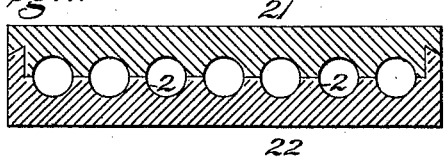
WITNESSES:
Darwin S. Wolcott
C. M. Clarke
INVENTOR,
Richard S. Waring
George H. Christy
Att'y.
N. PETERS, Photo-Lithographer, Washington, D. C.

UNITED STATES PATENT OFFICE.

RICHARD S. WARING, OF PITTSBURG, PENNSYLVANIA.

CONDUIT FOR ELECTRIC WIRES OR CABLES.

SPECIFICATION forming part of Letters Patent No. 378,561, dated February 28, 1888.

Application filed February 4, 1886. Serial No. 190,809. (No model.)

*To all whom it may concern:*

Be it known that I, RICHARD S. WARING, residing at Pittsburg, in the county of Allegheny and State of Pennsylvania, a citizen of the United States, have invented or discovered certain new and useful Improvements in Conduits for Electric Wires or Cables, of which improvements the following is a specification.

In the accompanying drawings, which make part of this specification, Figures 1 and 2 are end elevations of my improved conduit for electrical wires and cables, the cover of said conduit being shown closed in Fig. 1 and partially closed in Fig. 2. Fig. 3 is an end elevation showing a modified form of the conduit, whereby it is adapted for extension or expansion for the reception of a larger number of wires or cables. Fig. 4 is a view similar to Fig. 3, showing an expanded or enlarged conduit. Fig. 5 is a perspective view of a conduit, showing the manner of connecting two sections of a conduit together. Figs. 6 and 7 are views similar to Fig. 1, showing modified forms of the conduit and covers therefor. Fig. 8 is an end elevation of a form of conduit adapted for use as a curbstone along the edge of the pavement. Fig. 9 is a sectional view of a conduit having interchangeable parts.

The invention herein relates to certain improvements in conduits for underground electric wires or cables, and has for its object such construction of conduit and the parts thereof as to permit of their arrangement or location on a level with or slightly below the surface of the ground or pavement, thereby providing for easy access to the wires or cables in such conduit and avoiding the necessity of tearing up the streets or pavements when it is necessary to repair or loop the wires or cables therein or to lay new wires or cables; and to this end my invention consists in the construction and combination of parts substantially as hereinafter more fully described and claimed.

The conduit 1 consists of a rectangular box-shaped trough, preferably made of cast-iron and provided with a series of longitudinal vertical partitions, 2, dividing said trough into a series of two or more compartments for the reception of two or more kinds or classes of cables or wires, such construction also permitting of the separate treatment of the several cables or wires. For example, some of the wires or cables may require protection by a coating or covering of pitch. Along the inner edge of the sides of the trough, at or near the top thereof, are formed grooves 3 for the reception of a tenon or tongue, 4, formed along one edge of the parts 5 and 6 of the cover. The opposite edge of the part 5 is provided with a correspondingly-shaped tenon, 7, and the inner edge of the part 6 is provided with a groove, 8, for the reception of the tenon 7 when the two parts of the cover are placed in position, as clearly shown in Fig. 1. The combined width of the two parts 5 and 6 of the cover is slightly greater than the distance between the two sides of the box or trough-like conduit, and the partitions 2 are made of a height slightly less than the height of the grooves 3 from the bottom of the trough or conduit, the central partition being the lowest. By this construction I am enabled to push or force the meeting edges of the parts 5 and 6 of the cover a little below the horizontal plane passing through the grooves in the sides or the outer edges of the covers, thus permitting of their being held in position by the resiliency of the sides of the trough, the pressure of such sides tending, when the covers are arranged as shown in Fig. 1, to hold or force their meeting edges down upon the edges of the partitions and offer considerable resistance to any upward movement thereof. This conduit or trough is made in sections of approximately ten or twelve feet in length by casting the same in suitably-formed molds, said sections being united together in any suitable manner—as, for instance, as shown in Fig. 5, where the sections are shown provided with undercut lugs 9 for the reception of suitable bolts, 10, suitable springs, 11, being arranged between the heads of the bolts and the lugs, permitting the expansion and contraction of the sections under the changes of temperature.

In lieu of forming an integral box, 1, I may form the box in sections 12 and 13, as shown in Fig. 3, the meeting edges of the bottoms of the sections being provided with a tongue-and-groove connection, as clearly shown; and in lieu of forming the groove 3 along the inner side of the walls of the box or trough it may be formed in the edge thereof, as clearly shown, the parts 5 and 6 of the cover being provided with longitudinal ribs 4, formed on the under sides thereof and near the outer edges, the meeting edges of said parts 5 and 6 being provided with a tongue-and-groove connection, as above described. This sectional construction of the conduit permits of an enlargement or expansion thereof for the reception of a larger number of wires or cables when necessary, as clearly shown in Fig. 4, the enlargement or expansion being effected by the insertion of the sectional pieces 14 between the inner edges of the parts of the bottom and between the parts 5 and 6 of the cover, thereby effecting a lateral enlargement of the conduit, its vertical enlargement being effected by arranging correspondingly-shaped pieces along the upper edges of the side walls of the trough and of the partitions 2, said partitions being grooved for the reception of the tongues on the sections 14, as shown in Fig. 4. In lieu of forming the partitions 2 integral with the body of the conduit, as shown in Figs. 1, 2, and 3, the bottom of said conduit may be provided with a series of longitudinal grooves, 15, for the reception of the lower edges of the partitions 2, as shown in Fig. 4.

In making a conduit or trough of the form and construction shown in Fig. 4, the several parts may be formed by rolling the same in suitably-shaped grooves.

If it is desired or at any time necessary to laterally support the upper edges of the partitions, the parts 5 and 6 of the cover may be provided with suitable grooves for the reception of the upper edges of said partitions; or cross-braces may be affixed thereto in any suitable manner.

In order to provide for the looping out of one or more wires at any points along the length of the conduit, I provide such conduit at suitable intervals with a projecting hollow nib or lug, 16, through which the wires or cables can be passed for forming the loop.

In lieu of providing the conduit with a spring locking cover, as shown at Figs. 1 and 2, I may use a hinge cover, such as shown in Fig. 6, one of the side walls of the conduit being provided with an outward-projecting flange, 17, along its upper edge for engagement with a hook, 18, along one edge of the cover, the opposite edge of the cover being provided with a dependent flange, 19, to lap over the upper edge of the opposite wall of the conduit. In order to lock this cover in position, a series of slight projections or nibs, 20, are formed along the outer wall or side, to engage corresponding recesses on the inner side of the flange 19 when the cover is closed down on the conduit.

In the form of conduit above described the several compartments are adapted to receive two or more cables; but in some instances I prefer to arrange each cable or wire in a separate compartment, and for this purpose a conduit is formed of two slabs or sections, 21 and 22, of cast or wrought iron, having their meeting faces grooved longitudinally for the reception of a cable or wire. This form of conduit is especially adapted for such places where it is impossible to lay them at any considerable depth. These conduits can be arranged or located either in the street or gutter or along the pavement, as desired, and are adapted to be placed at any suitable distance below the surface of the ground, or (and as is preferable) with their upper edges flush with the surface of the pavement. In the latter case—I mean when the conduits are arranged with their upper edges flush with the surface of the pavement—the covers therefor are roughened or grooved in any suitable manner.

In some cases the pavements are laid immediately on top of the vaults of the houses, said vaults extending to the street-line, in which case it is impracticable to lay the form of conduit shown at Figs. 1, 2, 3, 4, 5, 6, and 7, and it is necessary to arrange the conduit either in the street or along the gutters; but in order to avoid tearing up the streets and gutters and thereby impeding traffic, I prefer to form the conduit as shown in Fig. 8, which is adapted to be used in lieu of the ordinary curbstone. In the outer face of the block 23 are formed a series of cells or compartments for the reception of one or more cables, and over the outer face of said block is placed a cover, 24, said cover having a projecting lug to engage a shoulder or projection on the upper edge of the block 23. These blocks 23 and 24 are made sufficiently thick and heavy to adapt them for use as a curbstone, as above stated; or, in lieu of the construction shown in Fig. 8, I may form the curbstone-conduit in a manner similar to Fig. 1—that is, of a narrow high box or trough having one or more compartments, as may be desired.

I do not wish to limit myself to any particular shape or form of conduit, nor to any special material to be used in their construction, as said conduits may be formed of wood, stone, or cement, as desired; but I prefer to form such conduits of metal, as such material will serve as a metallic screen to prevent the passage of induced currents from the cables or wires in one compartment to those in a compartment adjacent thereto. A prominent characteristic of the invention herein is the ready accessibility to all parts of the conduit without damage thereto either for the purpose of testing, repairing, looping, or adding more cables, thus avoiding the necessity of pulling wires and cables in and out of a length of conduit for any of the above purposes, as heretofore practiced, or the breaking of such conduit between its testing-boxes. The construction shown in Fig. 4 may be further modified, as shown in Fig. 9, wherein the top and bottom pieces of the conduits are exactly similar in construction, each being composed of two parts, the adjacent edges of such parts being united by a tongue-and-groove joint, as shown, and the outer edges of said parts being provided with a longitudinal groove, as shown. The sides of the conduit are formed by a series of longitudinal lengths or sections united to each other and to the top and bottoms of the boxes or troughs by tongue-and-groove connection.

The various parts above described can be formed either by rolling or casting, as may be preferred, and can be used interchangeably, as will be understood.

I claim herein as my invention—

1. A conduit for electric wires or cables, having in combination an open-sided box and a removable cover therefor, said cover being composed of two or more parts, and being so constructed as to be sprung in place on the box and held therein by the resilient pressure of the sides of said box, substantially as set forth.

2. A conduit for electric wires or cables, having in combination an open-sided box or trough, the sides of said box being grooved, as described, and a removable cover therefor, said cover being composed of two or more parts united by a tongue-and-groove joint, the outer edges of the cover being provided with tongues adapted to fit within the grooves in the sides of the box, substantially as set forth.

In testimony whereof I have hereunto set my hand.

RICHARD S. WARING.

Witnesses:
 DARWIN S. WOLCOTT,
 R. H. WHITTLESEY.